March 23, 1937.   O. H. FOWLER   2,074,723
BRAKE
Filed April 29, 1931
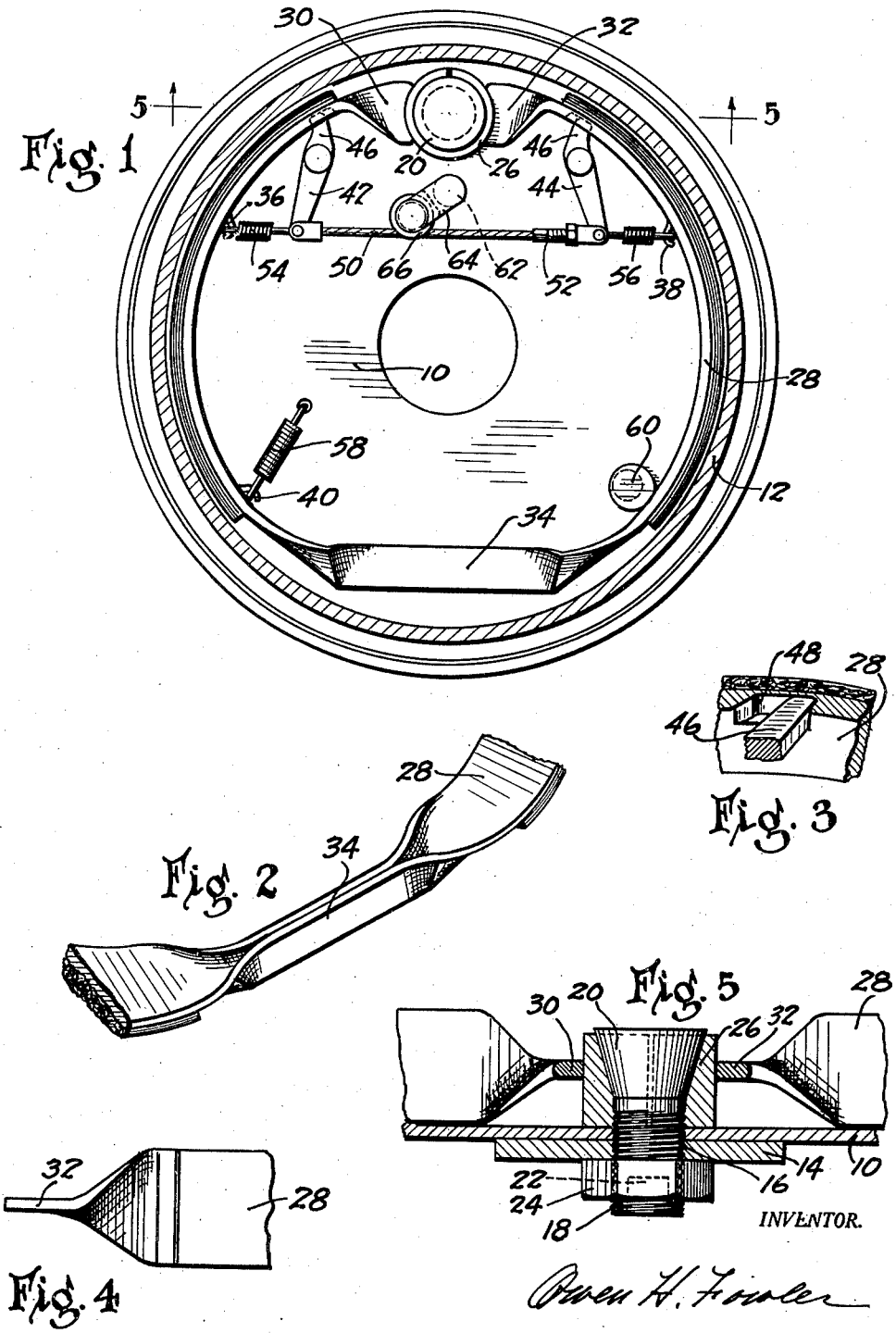
INVENTOR.
Owen H. Fowler Patented Mar. 23, 1937

2,074,723

UNITED STATES PATENT OFFICE 2,074,723

BRAKE

Owen H. Fowler, South Bend, Ind., assignor to Bendix Brake Company, South Bend, Ind., a corporation of Illinois Application April 29, 1931, Serial No. 533,737

10 Claims. (Cl. 188—250)

This invention relates to brakes and more particularly to internal expanding brakes.

Broadly, the invention comprehends a simple and efficient brake of the internal expanding band type.

Heretofore, internal expanding bands of widely varying structure have been employed, however, they have not proved generally satisfactory because of the inherent bending or warping of the band when force is applied thereto through an operating means resulting in the band leaving the braking surface of the drum over extensive.

One objectionable feature of the internal expanding bands now in general use may be found in the shouldered or separable ends of the band. The shoulders are usually formed by welding or otherwise securing stiffening members or webs to the bands. This is an added cost in the production of the bands. It is the aim of the present invention to provide a simple and efficient internal expanding band which may be produced at the lowest possible cost.

An object of the invention is to provide a band having flexible and rigid portions.

Another object of the invention is to provide a band comprising a single piece provided with flexible and rigid portions.

Another object of the invention is to provide a band having portions deformed to provide rigid sections.

A further object of the invention is to provide a brake band having rigid portions formed by folding a section of the band upon itself.

A further object of the invention is to provide a split band having its separable ends deformed to provide rigid shoulders.

A further object of the invention is to provide a flexible brake band having separable ends providing rigid shoulders formed by bending or twisting the ends of the bands approximately ninety degrees.

A feature of the invention is a friction element comprising a single piece having portions deformed to provide rigid anchoring shoulders and stiffening sections.

Other objects and features of the invention will appear from the following description taken in connection with the drawing, which form a part of this specification, and in which:

Figure 1 is a vertical sectional view of a brake taken just back of the head of the drum illustrating the friction element and operating means in side elevation and showing the invention as applied;

Figure 2 is a perspective view of a portion of the friction element;

Figure 3 is a perspective view partly in section and partly broken away illustrating the friction element and showing its relation to the operating levers;

Figure 4 is a top plan view of one end of the friction element; and

Figure 5 is a sectional view substantially on line 5—5, Figure 1.

Referring to the drawing for more specific details of the invention, 10 represents a fixed support such as a backing plate which may be secured to an axle or a swivelled knuckle and associated with the backing plate is a rotatable drum 12 which may be secured to a wheel. The backing plate has spot-welded or otherwise secured thereto a reinforcing plate 14. These members are bored and threaded as indicated at 16 to receive a threaded bolt 18 having a conical head 20 and a slotted end 22, and threaded on the bolt against the backing plate is a lock nut 24.

As shown, a split spring washer 26 is positioned on the conical head of the bolt. This washer has tapering inner walls conforming to the head of the bolt, so that upon turning the bolt by a suitable adjusting wrench engaging the slot 22, the washer may be expanded or contracted. This structure provides a suitable anchor which may be adjusted to compensate for wear on the friction lining of the brake. It is, of course, to be understood that other forms of expansible washers may be employed without departing from the spirit of the invention.

Positioned on the backing plate is a friction element comprising a split band 28 surfaced with a suitable friction lining. As shown, the band is formed from a single piece having separable ends 30 and 32. The ends are deformed by twisting or bending the band at an angle of substantially ninety degrees with respect to the body of the band and the extreme ends are reshaped to embrace the anchor.

This band is further deformed by folding a portion of the band as indicated at 34. The folded portion lends strength and rigidity to the band and causes the band to more perfectly conform to the braking surface of the drum and avoids liability of bucking or warping of the band away from the braking surface of the drum upon the application of the applied force. The band is also provided with tongues 36, 38, and 40 stamped from the body thereof and deformed to provide suitable hooks for attachment of return springs, to be hereinafter described.

The operating means comprises corresponding levers 42 and 44 pivoted on the backing plate. These levers have offset ends 46 engaging slots 48 in the inner periphery of the band. The other ends of the levers are connected by a cable 50 with a suitable adjusting member 52 interposed. The cable is normally held under tension by return springs 54 and 56.

These springs are connected between the pivots connecting the cable to levers and the hooks 36 and 38 on the band. These springs together with an auxiliary return spring 58 connected between the hook 40 on the band and a fixed support on the backing plate serve to retain the band when in the off position against the anchor and a suitable adjustable stop 60. Because of the particular arrangement of the levers use of steady rests is avoided, since the relation of the levers to the band is such that the band is retained against lateral movement.

Positioned on the backing plate is an operating shaft 62 to which power is applied through a lever, not shown. The shaft 62 has suitably secured thereto an arm 64 upon which is positioned for rotation a flanged roller 66 adapted to travel on the cable 50.

Assuming that force is applied to rotate the shaft 62, the arm 64 is moved angularly. This causes roller 66 to travel on the cable 50 and to bend the cable. The force imposed on the cable through the roller draws the ends of the levers 42 and 44, to which the cable is connected, toward each other with the result that the offset ends 46 of the levers move in opposite directions away from the anchor, causing the band to move into drum engagement.

Because of the particular arrangement of the operating levers and their relation to the band lateral movement of the band is avoided. As the band is moved into drum engagement, the wiping action of the drum causes slight centrifugal movement or shifting of the band. The engagement of the operating levers with the band provides for this movement, so that the band may anchor at one end or the other according to the direction of drum rotation.

My novel operating means described above is more fully described and claimed in my copending divisional application Serial No. 96,792, filed August 19, 1936.

Because of the rigid portions of the band bucking or warping of the band from the braking surface of the drum is avoided. While only one rigid section is shown it will, of course, be understood that the band may be made with any number of rigid portions formed by folding the band upon itself.

Although this invention has been described in connection with certain specific embodiments, the principles involved are susceptible of numerous other applications that will readily occur to persons skilled in the art. The invention is, therefore, to be limited only as indicated by the scope of the appended claims.

Having thus described the various features of the invention, what I claim as new and desire to secure by Letters Patent is:

1. A friction element comprising a single band having one part of its length flexible and provided with a friction surface and another part of its length folded to provide a rigid web.

2. A friction element comprising a band having one part of its length bent upon itself to provide a rigid section and having another part of its length flexible.

3. A friction element comprising a split band having its ends twisted to provide shoulders positioned in a plane extending through the longitudinal axis of the band and perpendicular to the band and a section of the band folded upon itself.

4. A friction band having two flexible friction portions integrally and rigidly connected by a rigid portion arranged in a plane perpendicular to the axis of said band and which rigid portion is integrally connected at its ends to the flexible portions by twisted parts merging into the rigid and flexible portions of the band.

5. A friction band of substantially uniform width having two flexible friction portions integrally and rigidly connected by a portion folded upon itself to form a substantially radial double-thickness web.

6. A friction element for a brake comprising a band of substantially uniform width having two flexible sections connected by a rigid part deformed and folded into a plane perpendicular to the axis of the brake.

7. A friction element for a brake comprising a band of substantially uniform width, part of which is flexible and another part of which is deformed and folded into a plane perpendicular to the axis of the brake.

8. A friction element for a brake comprising a band of substantially uniform width having its ends and its center deformed and folded into a plane perpendicular to the axis of the brake.

9. A friction band of substantially uniform width having a flexible cylindrical portion integral with a portion folded longitudinally to form a double thickness and arranged in a plane at right angles to the axis of the band.

10. A brake element for engagement with a drum comprising an elongated flexible metallic strip having two drum-engaging portions on either side of a central portion thereof, said central portion being deformed to provide a rigid section interconnecting said drum-engaging sections.

OWEN H. FOWLER.